United States Patent
Liao

(10) Patent No.: US 6,811,346 B2
(45) Date of Patent: Nov. 2, 2004

(54) ROD ASSEMBLY

(76) Inventor: Tsun-Chi Liao, 1F, No. 7, Lane 545, Sec. 2, Chun-Kung Rd., Chun-Kung Li, Taichung (TW)

( * ) Notice: Subject to any disclaimer, the term of this patent is extended or adjusted under 35 U.S.C. 154(b) by 0 days.

(21) Appl. No.: 10/207,981

(22) Filed: Jul. 31, 2002

(65) Prior Publication Data

US 2004/0022577 A1 Feb. 5, 2004

(51) Int. Cl.$^7$ ................................................. F16B 7/04
(52) U.S. Cl. ...................................... 403/230; 403/234
(58) Field of Search ............................... 403/230, 231, 403/232, 233, 234, 258, 188, 187, 345

(56) References Cited

U.S. PATENT DOCUMENTS

| 4,355,919 | A | * | 10/1982 | Lievonen | ................ | 403/234 X |
|---|---|---|---|---|---|---|
| 4,358,214 | A | * | 11/1982 | Shull | ........................... | 403/234 |
| 4,386,870 | A | * | 6/1983 | Baroody | ...................... | 403/234 |
| 4,921,370 | A | * | 5/1990 | Handler et al. | ............. | 403/234 |
| 6,227,752 | B1 | * | 5/2001 | Friedrich | ................ | 403/234 X |

* cited by examiner

Primary Examiner—Lynne H. Browne
Assistant Examiner—John R. Cottingham
(74) Attorney, Agent, or Firm—Birch, Stewart, Kolasch & Birch, LLP

(57) ABSTRACT

A rod assembly comprises a first rod, a second rod, and a fixing element fastening the first rod with the second rod. The first rod at least includes an abutment at one end thereof. The abutment has a front surface conformal to an inner wall of the second rod. A tenon having a polygon cross-section is formed on abutment. The second rod includes a slot and a through hole opposite to the slot. The fixing element is penetrated through second rod to fixedly fasten the first rod with the second rod.

5 Claims, 6 Drawing Sheets

ROD ASSEMBLY

FIELD OF THE INVENTION

The invention relates to a rod assembly, in which two rods are perpendicularly jointed with each other with improved assembling speed and reduced cost.

BACKGROUND OF THE INVENTION

FIG. 1 is a schematic view of a conventional rod assembly. As shown, the rod assembly includes two rods 1, 2 that are perpendicularly connected with each other by a joint 3. The joint 3 includes a pair of half joint sleeves 4 that have symmetric shapes. Each of the half joint sleeves 4 is provided with a plurality of holes 5 through each of which a screw 6 engages. The pair of half joint sleeves 4 are urged against each other by a butterfly nut 7 engaging upon the screw 6 and screwing it to fixedly fasten the rods 1, 2. When assembled, the pair of half joint sleeves 4 holds the intersection of the vertical rod 1 and the transversal rod 2. The butterfly nut 7 is placed on the screw 6 and screwed onto the half joint sleeve 4. Thereby, the rods 1, 2 are perpendicularly fastened with each other.

However, in such a configuration, many parts and elements are needed, such as the joint 3 including the pair of half joint sleeves 4, the screws 6 penetrating the holes 5 and the butterfly nuts 7. Furthermore, assembling the parts recited above are troublesome and thus the assembling cost is increased. More specifically, in a first step, the pair of the half joint sleeves 4 holds the intersection of the rods 1, 2 perpendicular to each other. In a second step, the screw 6 is engaged through the hole 5 of the half joint sleeve 4. In a third step, the butterfly nut 7 is placed on the screw 6 and screwed onto the half joint sleeve 4.

SUMMARY OF THE INVENTION

It is therefore a principal object of the invention to provide a rod assembly, in which two rods are perpendicularly fastened with each other with improved assembling speed and reduced cost.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The drawings included herein provide a further understanding of the invention and, incorporated herein, constitute a part of the invention disclosure. A brief introduction of the drawings is as follows.

DESCRIPTION OF THE PREFERRED EMBODIMENT

Figure 1:
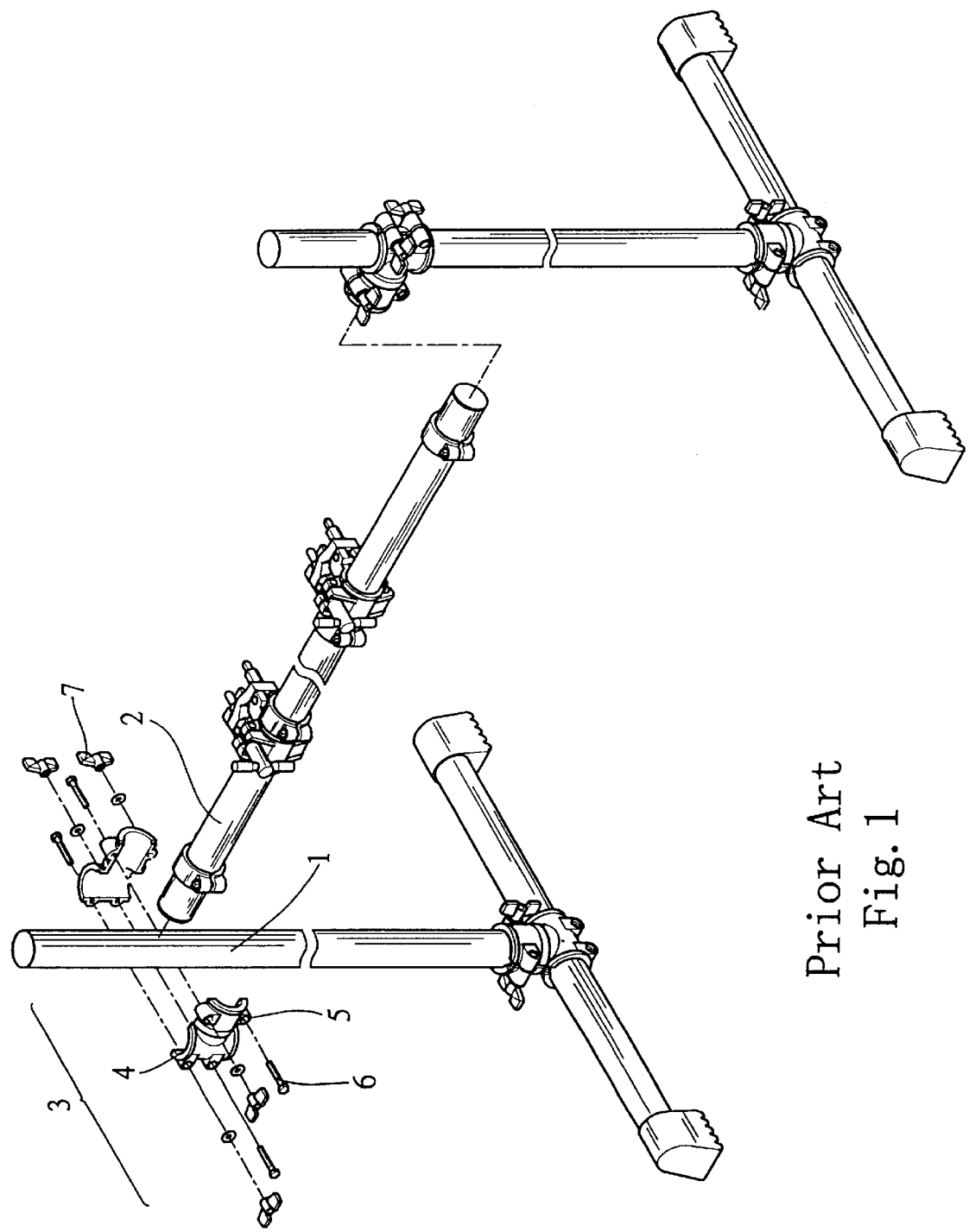
FIG. 1 is a schematic view of a conventional rod assembly.
Figure 2:
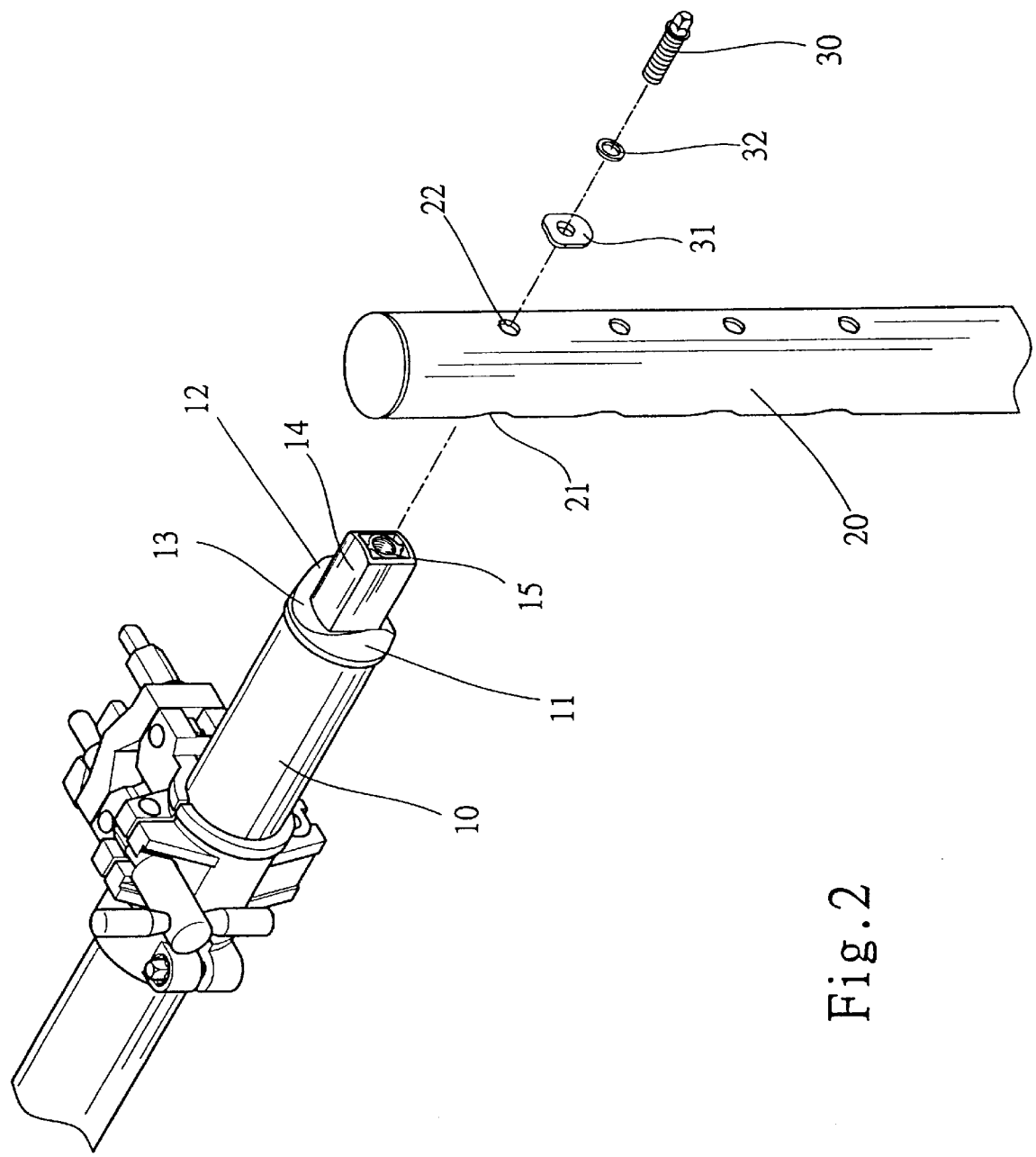
FIG. 2 is an exploded view of a rod assembly according to one embodiment of the invention in a view of one side.
Figure 3:
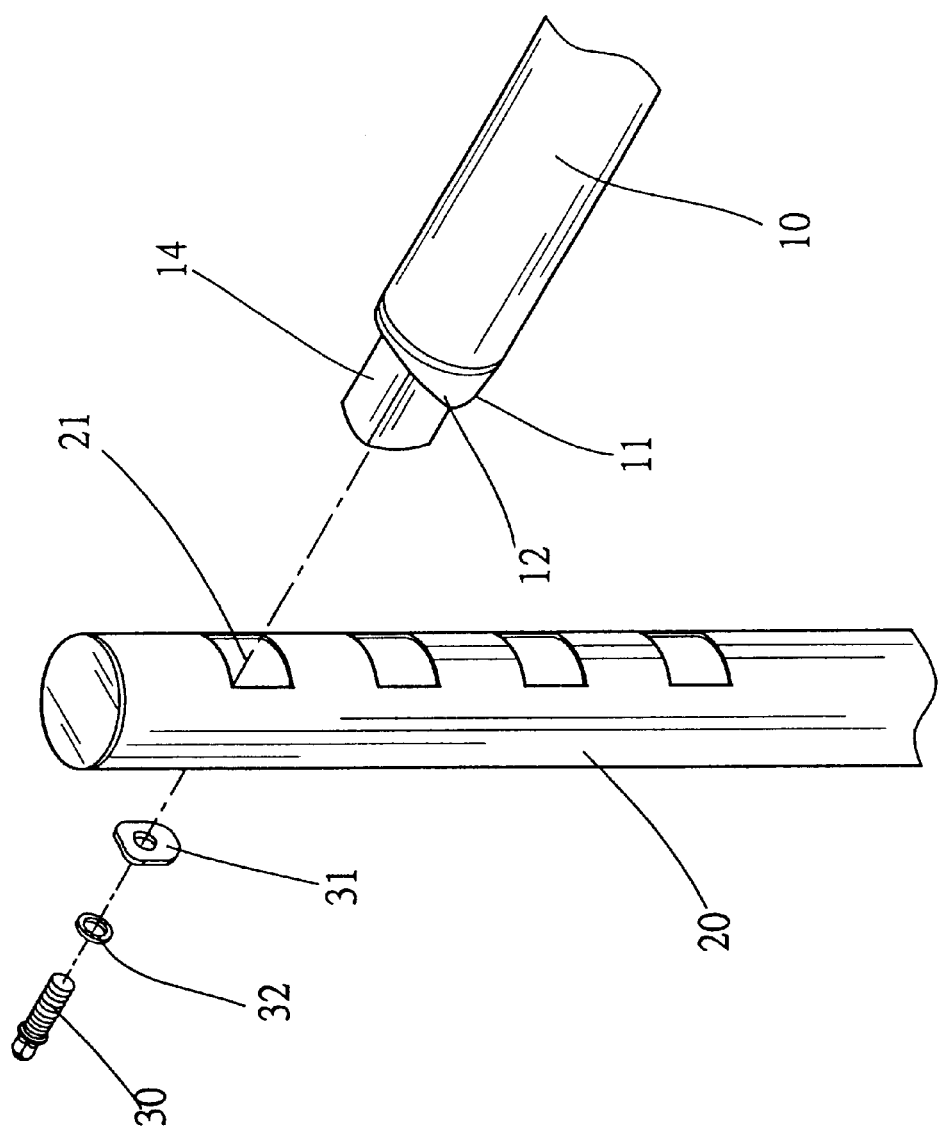
FIG. 3 is an exploded view of a rod assembly according to one embodiment of the invention in a view of the other side.

Referring now to FIG. 2 and FIG. 3, a rod assembly according to the invention includes a first rod 10, a second rod 20 that has to be fastened perpendicular with the first rod 10, and a fixing element 30 such as a screw. The first rod 10 is a rod body placed in a transversal direction and at least having an abutment 11 at one end thereof. The second rod 20 can be a hollow tube, for example. The abutment 11 includes a pair of opposite curved walls 12 that defines a recess 13 there between. The abutment 11 further includes a tenon 14 externally extending along a lengthwise direction of the first rod 10. The tenon 14 has a polygon cross-section, such as a square cross-section. The curved walls 12 are conformal to a inner wall of the second rod 12. The tenon 14 has a diameter smaller than the first rod 10 and is provided with a screw hole 15 in the center thereof.

The second rod 20 is a rod body placed in a vertical direction. The second rod 20 has a plurality of slots 21 each of which matches the tenon 14 of the first rod 10. The second rod 20 further has a plurality of through holes 22 opposite to the slots 21. The through holes 22 are smaller than the slots 21.

The screw 30 inserts through a clip plate 31 and a flexible gasket 32, and is screwed into the screw hole 15 of the tenon 14 after the tenon 14 of the first rod 10 is inserted into one of the slot 21. The clip plate 31 is conformal to an outer surface of the second rod 20 such that the first rod 10 can be more securely fastened with the second rod 20 by the screw 30.

Figure 4:
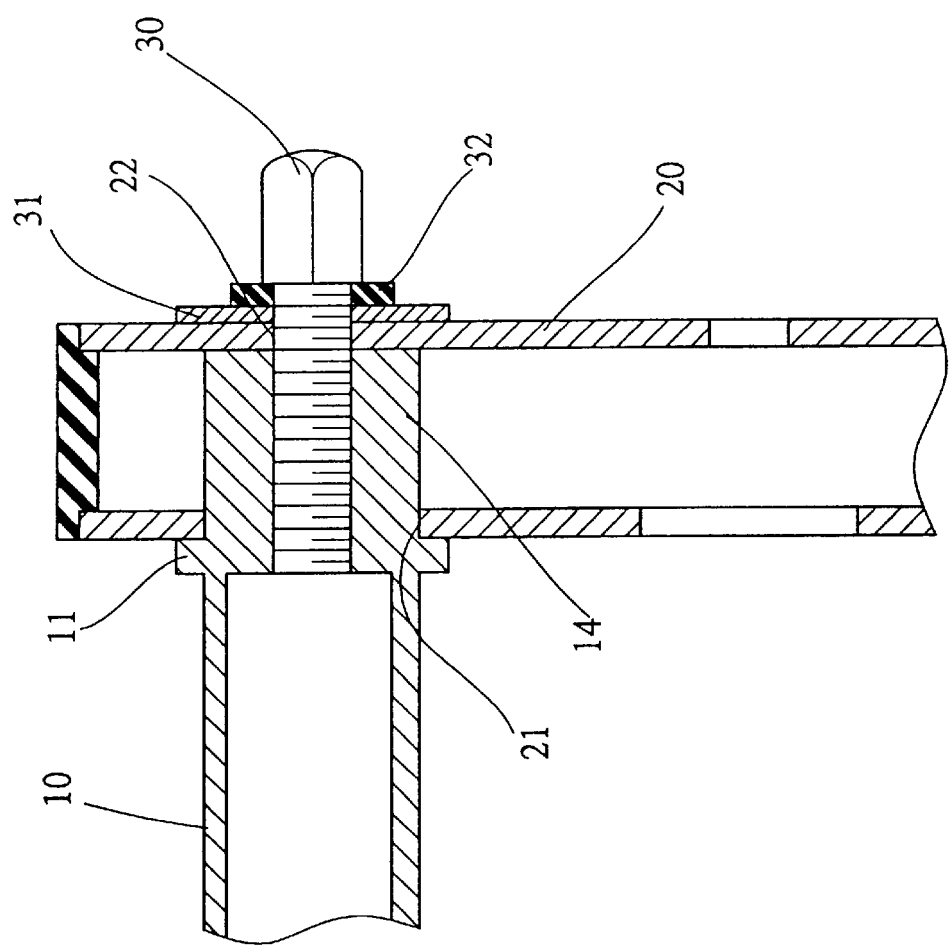
FIG. 4 is a partial cross-sectional view of a rod assembly according to one embodiment of the invention.

With reference to FIG. 4, the tenon 14 of the first rod 10 is inserted into one of the slots of the second rod 20 until it is pressed against an inner wall of the second rod 20. The screw 30 sequentially penetrates into the flexible gasket 32, the clip plate 31, and the through hole 22 that corresponds to the tenon 14 and exposes the screw hole 15 of the tenon 14. After the screw 30 is screwed, the curved walls 12 of the abutment 11 of the first rod 10 are urged against the second rod 20, and the recess 13 completely abuts against the second rod 20. Thereby, the second rod 20 is fixedly secured. Furthermore, since the tenon 14 having the polygon cross-section matches with the slot 21, the first rod 10 cannot be rotated after inserted into the slot 21. Moreover, the curved walls 12 of the abutment 11 are conformal to the inner wall of the second rod 20 when the tenon 14 is inserted into the slot 21, and the clip plate 31 is conformal to the outer surface of the second rod 20 when the screw 30 is screw into the tenon 14. The first rod 10 and the second rod 20 are therefore more securely fastened with each other.

Figure 5:
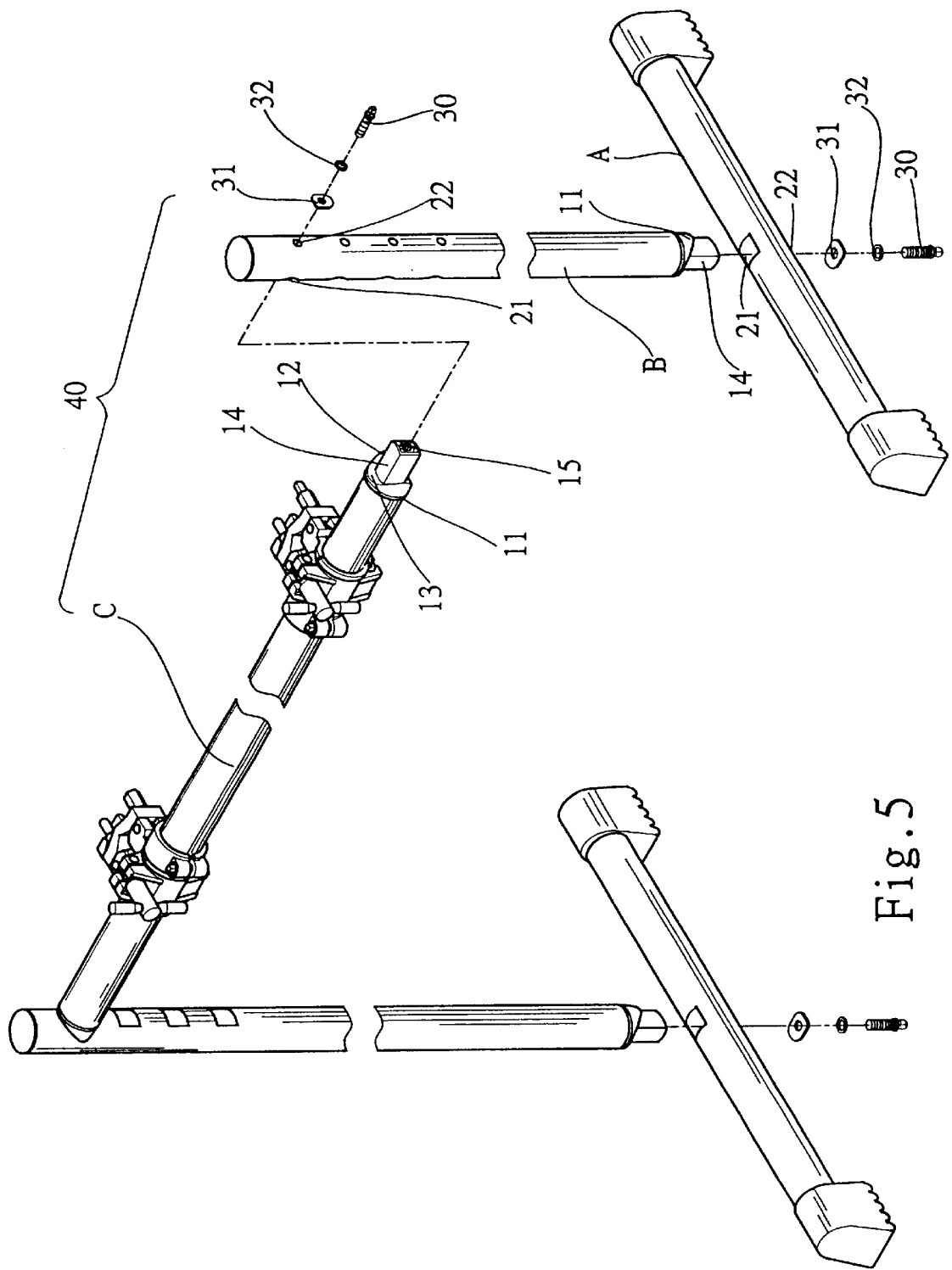
FIG. 5 is an exploded view of a rod assembly when used as a brace of music instruments according to one embodiment of the invention.
Figure 6:
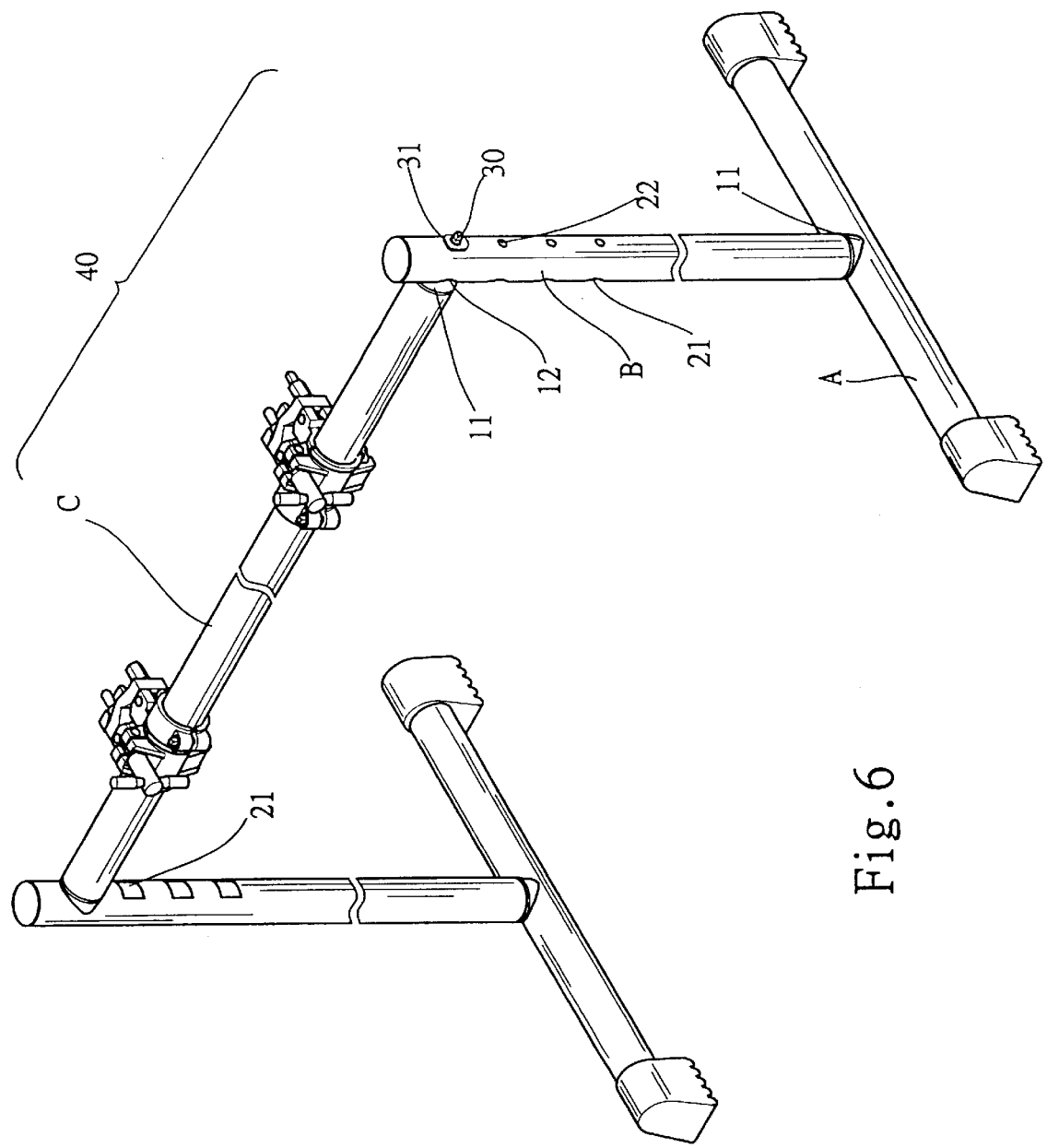
FIG. 6 is a schematic view of a rod assembly when used as a brace of music instruments according to one embodiment of the invention.

With reference to FIG. 5 and FIG. 6, the rod assembly of the invention can be used in a brace 40 of a music instrument. The brace 40 includes a pair of legs A, a pair of vertical rods B, and a transversal rod C transversally connecting the pair of the vertical rods B. The legs A are respectively provided with a square slot 21 through which a tenon 14 located at one end of the vertical rod B is inserted. A screw 30 sequentially penetrates through a flexible gasket 32, a clip plate 31, and a through hole 22 (not shown) that corresponds to the tenon 14 and exposes a screw hole 15 of the tenon 14. After the screw 30 is screwed, vertical rod B is perpendicularly fixed to the leg A. A plurality of square slots 21 are formed on the upper portion of each vertical rod B. The transversal rod C has an abutment 11 at each end thereof. The abutment 11 includes a pair of curved walls 12 that defines a recess 13 there between. One of the tenons 14 of the transversal rod C is inserted into one of the square slots of one of the vertical rods B. The cured walls 12 of the abutment 11 are conformal to the inner wall of the second rod 20 when the abutment 11 is inserted into one slot 21, and the clip plate 31 is conformal to the outer surface of the second rod 20 when the screw 30 is screwed into the tenon 14. Similarly, the other tenon 14 of the transversal rod C is inserted into the corresponding square slot on the other vertical rod B. As such, the pair of vertical rods B can be securely fixed on the respective legs A. The transversal rod C for assembling the music instruments is thereby securely fastened with the pair of the vertical rods B, as shown in FIG. 6. The position of the transversal rod C can be changed via the square slots 21.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A rod assembly, comprising:
   a first rod at least having an abutment at one end thereof, wherein a tenon having a polygon cross-section is formed on the abutment;
   a second rod having a slot and a through hole opposite to the slot;
   a fixing element penetrating through second rod to fixedly fasten the first rod with the second rod; and
   a clip plate and a flexible gasket between the through hole and the fixing element.

2. The rod assembly of claim 1, wherein the abutment has a front surface conformal to an inner wall of the second rod.

3. The rod assembly of claim 1, wherein the through hole is smaller than the slot.

4. The rod assembly of claim 1, wherein the fixing element is a screw.

5. The rod assembly of claim 1, wherein the tenon of the first rod is further provided with a screw hole through which the fixing element is penetrated.

* * * * *